(12) United States Patent
Niroumand et al.

(10) Patent No.: US 12,428,603 B2
(45) Date of Patent: Sep. 30, 2025

(54) WET METHOD FOR IMPROVING SOIL STABILITY USING AQUEOUS NANO-CEMENT SUSPENSION AND ULTRASONIC DISPERSION

(71) Applicants: Hamed Niroumand, Tehran (IR); Lech Bałachowski, Gdansk (PL)

(72) Inventors: Hamed Niroumand, Tehran (IR); Lech Bałachowski, Gdansk (PL)

( * ) Notice: Subject to any disclaimer, the term of this patent is extended or adjusted under 35 U.S.C. 154(b) by 368 days.

(21) Appl. No.: 18/125,732

(22) Filed: Mar. 24, 2023

(65) Prior Publication Data

US 2024/0318080 A1    Sep. 26, 2024

(51) Int. Cl.

| | |
|---|---|
| *C09K 17/10* | (2006.01) |
| *B01F 23/50* | (2022.01) |
| *B01F 101/28* | (2022.01) |
| *C04B 7/52* | (2006.01) |
| *C04B 111/00* | (2006.01) |
| *E02D 3/12* | (2006.01) |
| *E02D 17/20* | (2006.01) |

(52) U.S. Cl.
CPC .............. *C09K 17/10* (2013.01); *B01F 23/511* (2022.01); *B01F 23/551* (2022.01); *C04B 7/527* (2013.01); *E02D 3/126* (2013.01); *E02D 17/20* (2013.01); *B01F 2101/28* (2022.01); *C04B 2111/00172* (2013.01); *C04B 2111/00732* (2013.01)

(58) Field of Classification Search
CPC ...... C09K 17/10; B01F 23/511; B01F 23/551; B01F 2101/28; C04B 7/527; C04B 2111/00172; C04B 2111/00732; C04B 7/52; C04B 28/02; E02D 3/126; E02D 17/20

See application file for complete search history.

(56) References Cited

U.S. PATENT DOCUMENTS 2,752,260 A * 6/1956 Hawkins ................. C04B 24/12
                                                 106/808
4,106,296 A * 8/1978 Leonard, Jr. ............ E02D 17/20
                                                    47/9

(Continued)

FOREIGN PATENT DOCUMENTS

| CN | 111574162 A | * | 8/2020 | | |
| WO | WO-9528456 A1 | * | 10/1995 | ............... | E02D 3/12 |
| WO | WO-2016137629 A1 | * | 9/2016 | ............. | C04B 41/45 |

OTHER PUBLICATIONS

Effect of Adding Cement and Nanocement On Mechancial Propeteis of Clayel Soil Arash Yousefi Homayoun Jahanian Mohammad Azadi Eur Phys J Plus (2020) 135:649 (Year: 2020).*

(Continued)

*Primary Examiner* — Pamela H Weiss

(74) *Attorney, Agent, or Firm* — Andrzej Malarz, Esq.

(57) ABSTRACT

A method for improving the stability of a soil sample comprises a steps of: a) acquiring the soil sample, b) acquiring a cement, c) forming a cement powder (nano-cement) with an average particle size of between 2 nm and 150 nm, optionally preparing a suspension of the nano-cement in water, d) mixing the cement powder or the suspension of the cement powder in water with the soil sample in a weight ratio of between 1:100 and 1:1 of the cement powder to the soil sample, respectively, e) applying the mixture obtained in step d) to the required construction site, optionally by applying the PWS mixture.

7 Claims, 4 Drawing Sheets

(56) References Cited

U.S. PATENT DOCUMENTS

| | | | | |
|---|---|---|---|---|
| 4,107,112 | A | * | 8/1978 | Latta, Jr. ................ C09K 17/18 523/132 |
| 4,697,961 | A | * | 10/1987 | De Boodt ................ E02D 3/12 106/633 |
| 5,820,302 | A | * | 10/1998 | Roberts ................ C09K 17/12 106/900 |
| 2012/0246371 | A1 | * | 9/2012 | Fu ...................... G01R 31/2808 710/301 |
| 2015/0175481 | A1 | * | 6/2015 | Pisklak .................... E04B 1/16 52/741.1 |
| 2021/0246371 | A1 | | 8/2021 | Niroumand et al. |

OTHER PUBLICATIONS

Synthesis of a Cementious Material Nanocment Using Bottom Up Technology Concept an Alternative Approach to Avoid CO2 Emission During Production of Cement Buyn Wan Jo Sumit Chakrabory Kwang Won Yook Handawi Publishign Corp Journal of Nanomaterials Volum 2014 Artile ID 409380 12 pags (Year: 2014).*

Nano Soil Improvement Technique Using Cement Hamed Niroumand Lech Balachowski Reza Parviz Sicentific Reports (2023)13:1-724 (Year: 2023).*

* cited by examiner

WET METHOD FOR IMPROVING SOIL STABILITY USING AQUEOUS NANO-CEMENT SUSPENSION AND ULTRASONIC DISPERSION

BACKGROUND OF THE INVENTION

Field of the Invention

The present disclosure generally relates to materials engineering, and more particularly to a method of the production of modified cement powder (so called nano-cement). The present disclosure also relates to a method of soil improvement with the modified cement powder.

Brief Description of the Background of the Invention Including Prior Art

Soil stabilization is a subset of soil improvement methods, which are often used in many earthworks-related engineering fields to improve the parameters of the soil, such as mechanical integrity, water permeability and other, in order to prepare the ground for the intended construction project.

One of the most popular techniques of stabilizing the soil is adding other materials to the soil and/or mixing it together. Existing soil stabilization additives include dispersants, synthetic resins, cement, salts, alkalis and many others and are distributed in a form of a powder, a suspension, a spray or any other suitable method.

As earth-related engineering projects often require large-scale soil processing, cost-effectiveness of the soil improvement method, and thus the cost-effectiveness of the soil stabilization additive used, plays an important role in the construction process. However, modifying the soil with an extraneous material, especially synthetic, may have a significant impact on the ground and the surrounding environment, which must also be considered when choosing the additive.

U.S. Pat. No. 5,820,302 discloses a method of stabilizing soil, a method of forming a structure and a stabilization formulation for a soil aggregate base material useful for forming a structure. The soil stabilization method includes combining a soil aggregate base material with a composition, adding cement to the combination of the base material and the composition and adding water to the resulting mixture whereby sufficient water is added to the resulting mixture to hydrate the cement and thereby provide a stabilized soil aggregate matrix suitable for use in a structure. The minimum amount of cement added is 1% based on the weight of the soil aggregate base material. The composition comprises an alkali metal silicate and a water soluble divalent or trivalent cation. The amount of the cement added to the composition may be adjusted according to the composition and characteristics of the soil at the target construction site. However, the effect of adding cement to the combination of the base material and the composition varies greatly depending on the physical properties of the cement used, therefore, an optimal and universal physical parameters, such as a precise range of the cement particle size needs to be found in order to ensure uniform and reproducible effect on the target soil mixture.

U.S. Pat. No. 4,106,296 also discloses a method of soil stabilization. The method includes applying to the soil an aqueous emulsion comprising water and an epoxy resin ester, compacting the wet soil to a predetermined density and curing the reaction product wetting the compacted soil at ambient conditions. The aqueous emulsion comprises water and an epoxy resin ester which is a reaction product of bisphenol A-glycidyl ether type epoxy resin with an unsaturated fatty acid. The ratio of water to said reaction product is about 1:1 to about 1000:1. The use of the epoxy resin ester significantly improves the overall stability of the target soil mixture but from the long term perspective it may be considered an environmental hazard for the target construction site and its adjacent surroundings.

US20210246371 discloses a method for stabilizing a soil sample and a soil stabilizing composition. The method comprises forming a *Typha latifolia* powder by grinding in a ball mill comprising a plurality of balls, forming a *Typha latifolia* suspension in water and mixing the *Typha latifolia* suspension with the soil sample. The weight ratio of *Typha latifolia* to the plurality of balls is between 1:15 and 1:30 (*Typha latifolia*:plurality of balls) and the weight ratio of the *Typha latifolia* powder and water is between 1:100 and 18:100 (*Typha latifolia* powder:water). Using *Typha latifolia* as the main constituent of the soil stabilizing composition is ecologically advantageous, however, industrial applicability must be considered as acquiring the *Typha latifolia* raw material for an industrial scale production of the *Typha latifolia* powder may pose a logistical and economical challenge. Moreover, *Typha latifolia*, being an organic material, is characterized by a limited chemical reactivity, leading to a target soil mixture of a lesser binding strength, which is obtained upon mixing the *Typha latifolia* powder with a soil sample.

As explained above, there is a need for a method of soil stabilization, being both cost-effective and environmentally friendly, while also allowing for various methods of application, according to the needs of a given construction project.

SUMMARY OF THE INVENTION

Purposes of the Invention

It is an object of the present invention to provide an improvement of the available engineering and scientific parameters in any project that in analyzed identification tests (such as SEM, XED and XRF) and the optimal amount is prescribed and the project execution procedure may be defined according to it. For the processes called "Nano Soil-Improvement (NSI)", "Nano Ground-Improvement (NGI)", "Nanotechnology in Geotechnical Engineering (NGE)" and "Nanotechnology in Building Materials (NBM)", a nano-additives like nano-cement are used in various formulations in building materials and soils. In the method of production the nano-cement, a particles of any commercially available cement may be converted from centimeter or millimeter dimensions to nano dimensions and then according justification and optimal use of the nano-cement, it may be used for engineering and scientific parameters of related applications. This nano-cement, in this description also called a modified cement powder or a powder, can be used to prepare a suspension of the powder in a water, or a mixture of the powder, the water and the soil, hereinafter also called a "spray". The spray may be used in various industries like reinforcing concrete, soil stabilizing, heritages and conservation, treated rammed earth wall, 3d printing construction, urban and transportation infrastructures, dams, tiles, ceramics, nano ground improvement techniques, nano-jet grouting, nano-deep soil mixing, nano-grouting, nano-concrete, various types of concrete. Building industry, steel factories, reconstructing of places, and all applications in various industries. Chemical materials like petroleum product are irresolvable materials and have limited resources so using reproducible like cement may be useful. In the production of the nanoparticles of cement, only the cement may be used. The particle size of the primary cement powder (batch cement) may determine the degree of purity, the shape of the material particles, and the degree of quality of the material. Nanomaterials in the unconcentrated state are called nano-powders. In this case, their grain size may be in the range of 1 to 100 nanometers in one dimension or in three dimensions. The existing design uses a "top-down" approach as a method for production of nano-additives to fabricate a nano-cement. Ball milling is more important due to its access and simple production process, higher nanoparticle production speed, cost-effectiveness, and implementation.

These and other objects and advantages of the present invention will become apparent from the detailed description, which follows.

BRIEF DESCRIPTION OF THE INVENTION

The object of the invention is to provide a method for production of a modified cement powder, in this description also called a nano-cement, comprising the steps of:
a) acquiring batch cement, wherein the batch cement includes any type of cement available on the market,
b) forming a modified cement powder with an average particle size of between 2 nm and 150 nm, wherein forming the modified cement powder is performed by grinding and/or crushing and/or shreading the batch cement in a rotating ball mill, wherein the ball mill includes a plurality of mill balls, wherein the average particle size of at least 50% of the modified cement powder produced is between 2 nm and 150 nm, preferably between 2 nm and 100 nm. The names "nano-cement" or "modified cement powder" used in this description means a cement which average particles size as measured using a DLS or SEM method is below 150 nm, preferably below 100 nm. The nano-cement or the nanomaterials may be used in either dry or suspension form. In previous studies, the effect of nanomaterials in both dry and water-suspanable form has been investigated and, according to the reports presented, the use of nanomaterials in the suspension has a better performance than the powder. When the particles are mechanically reduced to a smaller particles at the nanoscale, the energy level of the particles may be high due to their small size, so they may react quickly together. For the purpose of reference, it may be understood that this may cause the particles to agglomerate and form larger particles.

Another object of the invention is a method for improving the stability of a soil sample. The additives in the form of the powder, the suspension, and the spray can be used as soil stabilizer in various practical projects. Soil stabilization is one method of soil improvement techniques in geotechnical engineering. These additives can be used in improved soil of rammed earth walls, earth buildings, earth houses printed by 3D printing machines, and all applicable applications. The method comprises steps of: a) acquiring the soil sample, b) acquiring batch cement, wherein the batch cement includes any type of cement available on the market, c) forming a modified cement powder with an average particle size of between 2 nm and 150 nm, d) mixing the modified cement powder with the soil sample in a weight ratio of between 1:100 and 1:1 of the modified cement powder to the soil sample, respectively, e) applying the mixture obtained in step d) to the required construction site, f) forming the mixture at the construction site in accordance with a predetermined construction project until a structure of predetermined dimensions is obtained, g) exposing the structure obtained in step f) to an amount of water for the curing time. In an exemplary embodiment, the water may be used in order to produce the aqueous suspension of the nano-cement. The suspension may include in various percentages such as 1%, 3%, 5% and 7% of the nano-cement and the rest up to 100% is the water. In order to prepare the 3% nano-cement, the nano-cement is added to the water at the content of 3% of the water weight and the desired suspension is obtained. For 5% nano-cement suspension, the nano-cement is added to the water at 5% by weight of the water and the desired suspension is obtained. For 7% nano-cement suspension, the nano-cement is added to the water at 7% by weight of the water and the desired suspension is obtained. The curing time is a time suitable for curing of the modified cement powder used in said method. In particular, the curing time is a time period of 1 to 30 days, preferably 2 to 20 days, more preferably 3 to 10 days, and most preferably 4 to 8 days. In other words, the curing time is a time which passes from the exposure of the modified cement powder to the water until the structure cures and reaches the predetermined construction properties and it depends on the type of the batch cement used for said method. The average particle size of the modified cement powder is measured using a DLS or SEM method. The Dynamic Light Scattering (DLS), sometimes referred to as Quasi Elastic Light Scattering (QELS), is a non-invasive, well-established technique for measuring the size and size distribution of molecules and particles typically in the submicron region, and with the latest technology, lower than 1 nm. The Scanning Electron Microscope (SEM) projects and scans a focused stream of electrons over a surface to create an image. The electrons in the beam interact with the sample, thereby producing various signals that can be used to obtain information about the surface's topography and composition.

In one embodiment, the step c) of forming the modified cement powder is performed by grinding and/or crushing and/or shreading the batch cement in a rotating ball mill, wherein the ball mill includes a plurality of mill balls, wherein the average particle size of the modified cement powder produced in step c) is preferably between 2 nm and 100 nm, more preferably between 40 nm and 80 nm, and most preferably between 50 nm and 70 nm. The mill balls are metal or ceramic balls which are freely movable inside the ball mill chamber. While the ball mill chamber rotates, the mill balls hit the cement particles, for example the particles of the cement are hit and crushed between two or more mill balls or between the mill balls and the walls of the ball mill chamber. The size and weight as well as the number of the mill balls are selected experimentally. The conducted research indicated, that for reaching the best result of the required modified cement powder particle sizes, very important is the weight ratio of the batch cement to the weight of the plurality of the mill balls.

In one embodiment, the weight ratio of the batch cement to the weight of the plurality of the mill balls is between 1:15 and 1:30 wt/wt, preferably between 1:18 and 1:27 wt/wt, more preferably between 1:21 and 1:24 wt/wt, and most preferably between 1:22 and 1:23 wt/wt, respectively.

In one embodiment, the ball mill is configured to rotate at a rotational speed between 600 rpm and 4200 rpm, preferably 1000 rpm and 3000 rpm, more preferably 1500 rpm and 2500 rpm, and most preferably 1800 rpm and 2200 rpm. The ball mill is not an object of the invention as such, however, any adjustable parameters of the ball mill, like for example the rotational speed, operation time or positioning of the rotation axes in space can be used in order to obtain the desired outcome parameters of the output product, namely the nano-cement or the modified cement powder.

In one embodiment, the weight ratio of the modified cement powder and the soil sample as ingredients for mixing in step d) is between 1:100 and 1:1 wt/wt, preferably between 1:90 and 1:10 wt/wt, more preferably between 1:70 and 1:30 wt/wt, and most preferably between 1:60 and 1:40 wt/wt, respectively.

In one embodiment, step d) of mixing the modified cement powder and the soil sample includes mixing for a period of time from 10 minutes to 120 minutes, preferably from 20 minutes to 100 minutes, more preferably from 40 minutes to 90 minutes, and most preferably from 60 minutes to 70 minutes.

In one embodiment, step d) of mixing the modified cement powder and the soil sample is performed by a rotary mixer configured to rotate at a rotational speed of between 70 rpm and 120 rpm, preferably between 80 rpm and 110 rpm, more preferably between 90 rpm and 100 rpm, and most preferably between 93 rpm and 96 rpm.

Another object of the present invention is a method for improving the stability of a soil sample, wherein the method comprises steps of: a) acquiring a soil sample, b) acquiring batch cement, wherein the batch cement includes any type of cement available on market, c) forming from the batch cement obtained in step b) a modified cement powder with an average particle size of between 2 nm and 150 nm, d) forming an aqueous suspension of the modified cement powder, e) mixing the aqueous suspension of the modified cement powder with the soil sample in a weight ratio of the aqueous suspension of the modified cement powder to the soil sample of between 1:100 wt/wt and 18:100 wt/wt, preferably between 3:100 wt/wt and 15:100 wt/wt, more preferably between 6:100 wt/wt and 12:100 wt/wt, and most preferably between 8:100 wt/wt and 10:100 wt/wt, respectively, f) applying the mixture obtained in step e) to the predetermined construction site, g) forming the mixture on the construction site in accordance with the predetermined construction project until a structure of predetermined dimensions is obtained, h) allowing the structure obtained in step g) to harden for a curing time. The curing time is a time suitable for curing of the batch cement used in said method. In particular, the curing time is a time period of 1 to 30 days, preferably 2 to 20 days, more preferably 3 to 10 days, and most preferably 4 to 8 days. In other words, the curing time is a time which passes from the exposure of the modified cement powder to water until the structure cures and reaches the predetermined construction properties and it depends on the type of the batch cement used for said method.

In one embodiment, step d) of forming the aqueous suspension of the modified cement powder includes forming the aqueous suspension of the modified cement powder with a weight ratio of the modified cement powder to the water between 1:100 wt/wt and 18:100 wt/wt, preferably between 3:100 wt/wt and 15:100 wt/wt, more preferably between 6:100 wt/wt and 12:100 wt/wt, and most preferably between 8:100 wt/wt and 10:100 wt/wt, respectively.

In one embodiment, step d) of forming the aqueous suspension of the modified cement powder includes mixing the modified cement powder and the water in an ultrasonic homogenizer. The ultrasonic homogenizer is powerful tools to mix and homogenize solid-liquid and liquid-liquid suspensions.

In one embodiment, the modified cement powder and the water is mixed in the ultrasonic homogenizer for the period of time between 10 minutes and 45 minutes, preferably between 15 minutes and 40 minutes, more preferably between 20 minutes and 35 minutes, and most preferably between 25 minutes and 30 minutes. The required mixing time of the cement powder and the water depends on type of cement and soil type for soil improvement.

In one embodiment, the modified cement powder suspension and the soil sample is mixed for the period of time between 1 and 15 minutes, preferably between 3 and 12 minutes, more preferably between 5 and 10 minutes, and most preferably between 6 and 8 minutes. The required mixing time of the modified cement powder suspension and the soil sample depends on type of cement and soil type for soil improvement.

In one embodiment, the modified cement powder suspension and the soil sample is mixed in a rotary mixer with a rotational speed of between 20 rpm and 80 rpm, preferably between 30 rpm and 70 rpm, more preferably between 40 rpm and 60 rpm, and most preferably between 50 rpm and 55 rpm. The required rotational speed of the rotary mixer depends on soil and soil types.

In one embodiment, applying the mixture obtained in step e) to the predetermined construction site is realized with a method of spraying. Regarding the spray method, the nano-cement suspension was placed in a water bath (ultrasonic bath) for 5-30 min to disperse the nano-cements for geochemical fractionation. The spraying is performed with a spraying device for spraying an enclosure with the aqueous suspension of the nano-cement (spray mixture). The spraying device (not claimed) includes a reservoir for containing the aqueous suspension of the nano-cement, a pump in fluid communication with the reservoir, and a movable spray head having an outlet orifice through which the aqueous suspension of the nano-cement from the reservoir is expelled during operation of the pump if there is such the aqueous suspension of the nano-cement in the reservoir. Said spraying device also contains an electrical motor drive mechanism for sequentially operating the pump and moving the spray head to modify the direction of the spray there from, such that the spray head is not simultaneously spraying and moving. The advantage of using the spraying device is uniformity in soil mixing.

BRIEF DESCRIPTION OF THE DRAWINGS

These aims together with other objects and advantages which will become subsequently apparent reside in the details of the construction and operation as more fully hereinafter described and claimed, reference being made to the accompanying drawings forming a part hereof, wherein the same numerals refer to the same parts throughout.

In drawings

DETAILED DESCRIPTION OF INVENTION AND PREFERRED EMBODIMENT

Figure 1A:
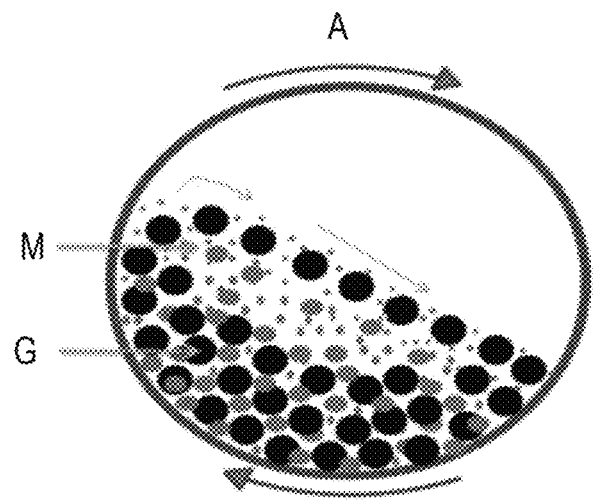
FIG. 1A illustrates schematically the work principle of the ball mill for the nano-cement production.
Figure 1B:
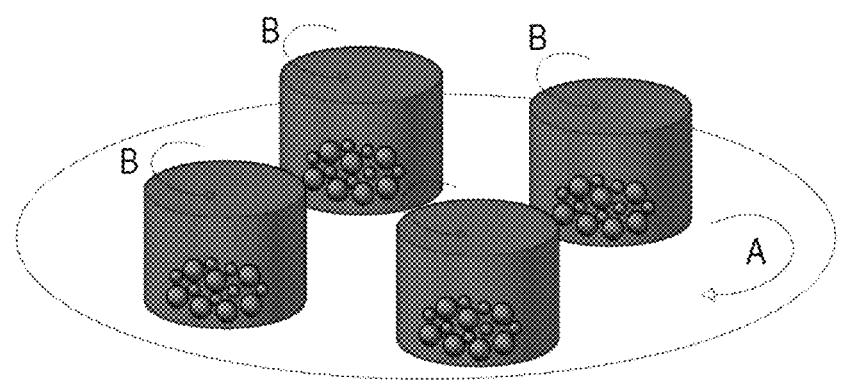
FIG. 1B illustrates schematically the work principle of another embodiment of the ball mill.
Figure 2A:
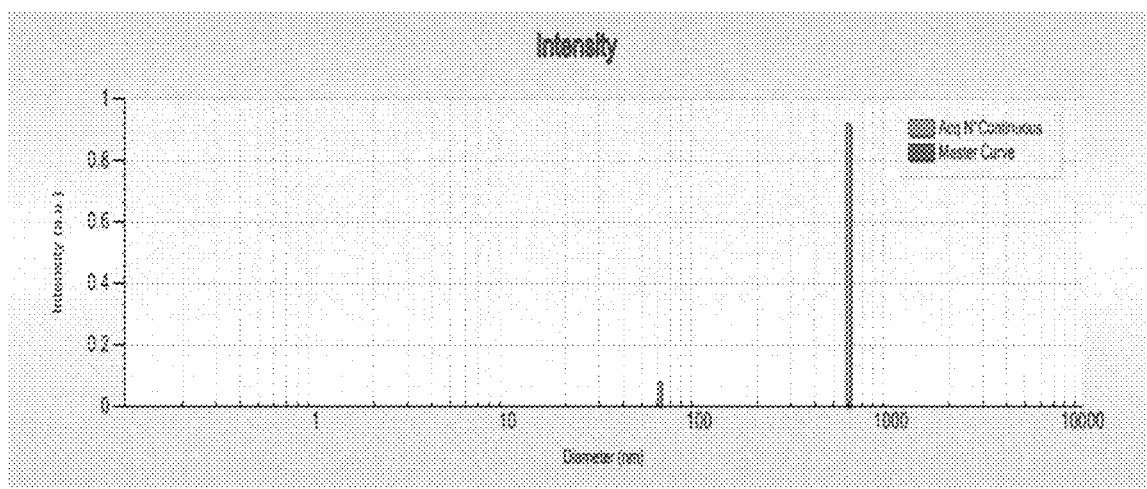
FIG. 2A illustrates a DLS analysis for the nano-cement regarding intensity.
Figure 2B:
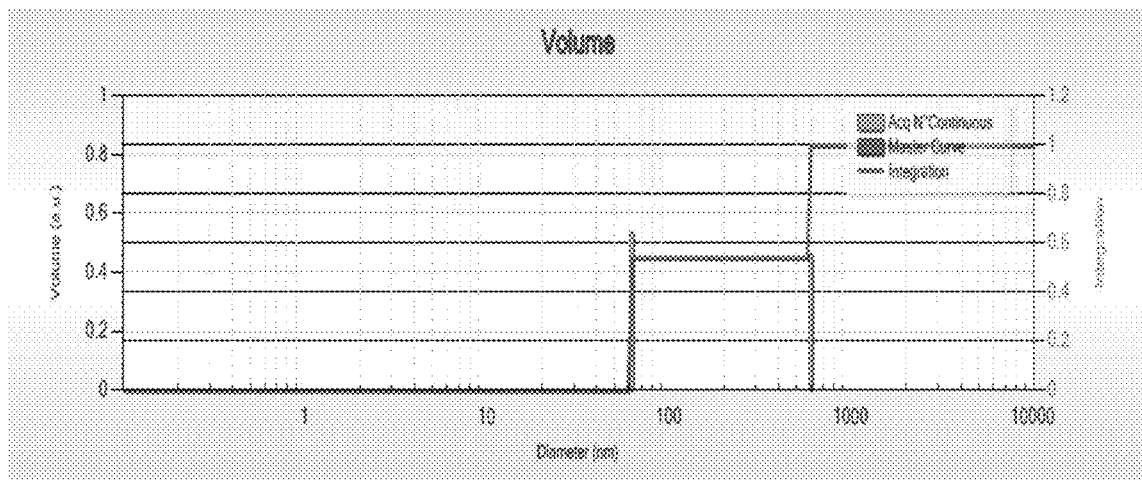
FIG. 2B illustrates a DLS analysis for the nano-cement regarding volume.
Figure 2C:
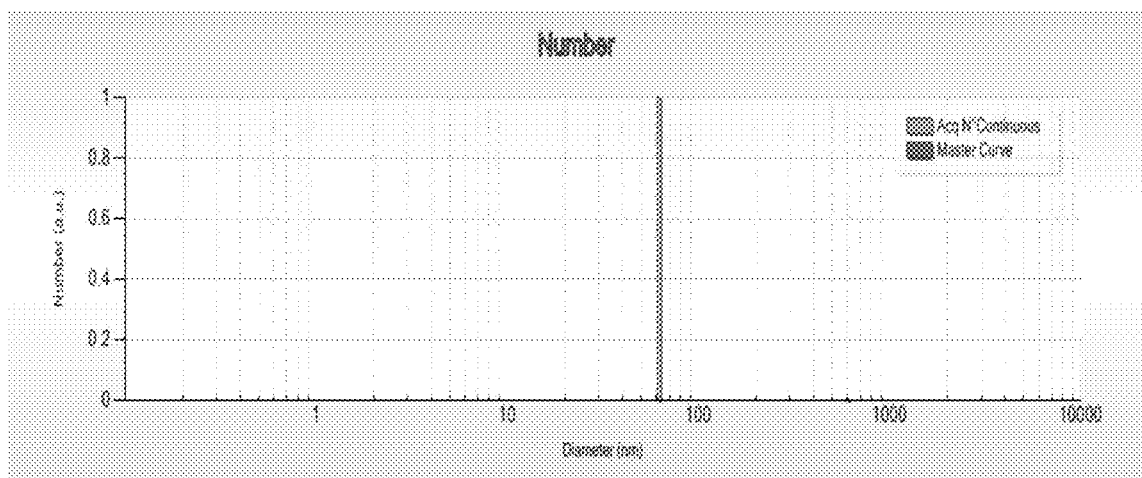
FIG. 2C illustrates a DLS analysis for the nano-cement regarding number.
Figure 3A:
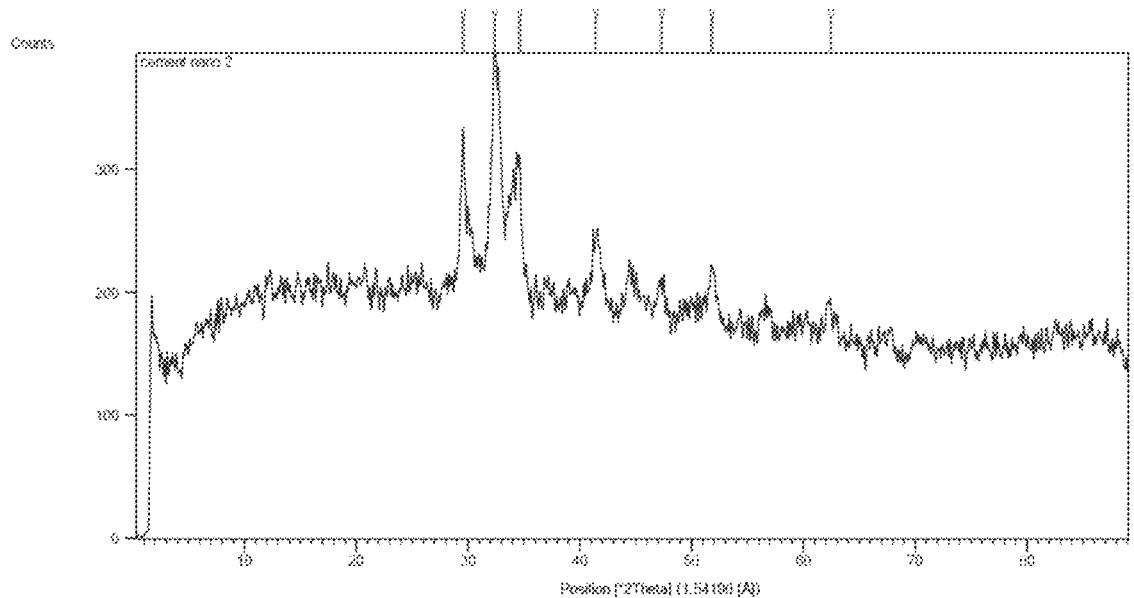
FIG. 3A illustrates a XRD diagram before the nano-cement production process, consistent with one or more exemplary embodiments of the present disclosure.
Figure 3B:
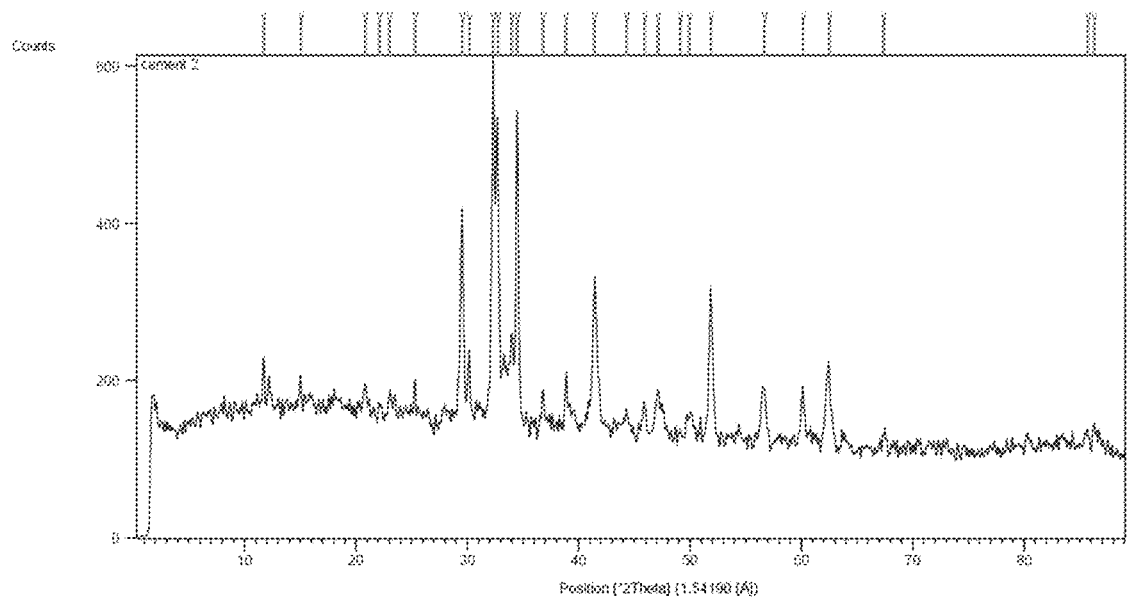
FIG. 3B illustrates a XRD diagram after the nano-cement production process, consistent with one or more exemplary embodiments of the present disclosure.

Referring to the drawing, FIG. 1A shows schematically a principle of operation of a ball mill (not claimed). The ball mills are well known, therefore the construction will be not described here in details. However, operating parameters of the ball mill, for example the size and material of the balls, the weight ratio of the balls to the batch cement, rotational speed of the ball mill cylinder, inclination of the rotational axis, time of operating, etc, are changeable and are to be set according to the requirements of the output material (the nano-cement). It can be seen on FIG. 1A that during operation, the ball mill cylinder rotates according to the direction of the arrow A. The crushing medium G, which includes a plurality of metal balls of sizes 1 cm, 1.5 cm and 2 cm, rotate inside the cylinder around an axis. The bottom plate of the device and the cylinders containing the material to be grinded and/or crushed and/or shredded which is the cement powder (batch cement, M) rotate around an axis perpendicular to each other in opposite directions (one clockwise and the other counterclockwise). These movements are creating a centrifugal force. The balls first are pressed to a wall of the cylinder due to the centrifugal force caused by the rotational motion of the chamber and then the centrifugal force caused by the rotational motion of the plate dominates the force and, the balls in the cylinder are falling on the batch cement material particles in a specific position due to the gravity and are causing them to crush and ultimately convert the particles to nano size. The wording "nano size" or "nano-cement" in this description means a size from around 5 nm to around 100 nm (nanometers). In simpler terms, these methods are among the methods in which by crushing and shredding larger materials and particles into smaller particles and continuing this process to the size of nanometers, they become nanoparticles, which means a particles with the average nano size as described above. The particle size of the primary powder of the batch cement may determine the degree of purity, the shape of the material particles and the degree of quality of the material. Another construction of the ball mill (not claimed) is shown on FIG. 1B. This planetary ball mill includes a number of ball mill cylinders (grinding jars) which are rotatably placed on an independently rotatable base plate. The directions of rotation B of the grinding jars and the directions of rotation A of the base plate are opposite. The grinding balls in the grinding jars are subjected to superimposed rotational movements, the so-called Coriolis forces. The difference in speeds between the balls and grinding jars produces an interaction between the frictional and the impact forces, which releases high dynamic energies. The interplay between these forces produces the high and very effective degree of size reduction of the planetary ball mill. In one example of the invention, the weight ratio of the batch cement and the metal balls put into the ball mill cylinder can be 1:5 and 1:15, the rotational speed of the cylinder can be 300-1500 rpm, the time of the operation can be 10-60 min. FIG. 2A, FIG. 2B and FIG. 2C shows a DLS Analysis for nano-cement suspension using Pade Laplace. The first order result from a DLS experiment is presented on FIG. 2A. It is the intensity distribution of particle sizes. The intensity distribution is weighted according to the scattering intensity of each particle fraction or family. The particle scattering intensity is proportional to the square of the molecular weight. The volume distribution presented on FIG. 2B demonstrates the total volume of particles in various size bins. The intensity distribution gives the amount of light scattered by the particles in the different size bins. The DLS number on FIG. 2C mean size distribution curves of the solution. The output results for determining the cement particle size range in FIG. 2A, FIG. 2B and FIG. 2C are between 5 and 100 nm. XRD tests have been performed to ensure that the output cement did not become contaminated by the wear of metal and ceramic balls during the nano production process. FIG. 3A and FIG. 3B shows the results of the XRD experiments. The nano-cement particles, respectively, are after the production process. The results of the XRD test are presented before and after the procedure. The X-ray diffraction (XRD) is a versatile non-destructive analytical technique used to analyze physical properties such as phase composition, crystal structure and orientation of the powder, the solid and the liquid samples. These figures show the crystallographic structure of the cement.

Figure 4:
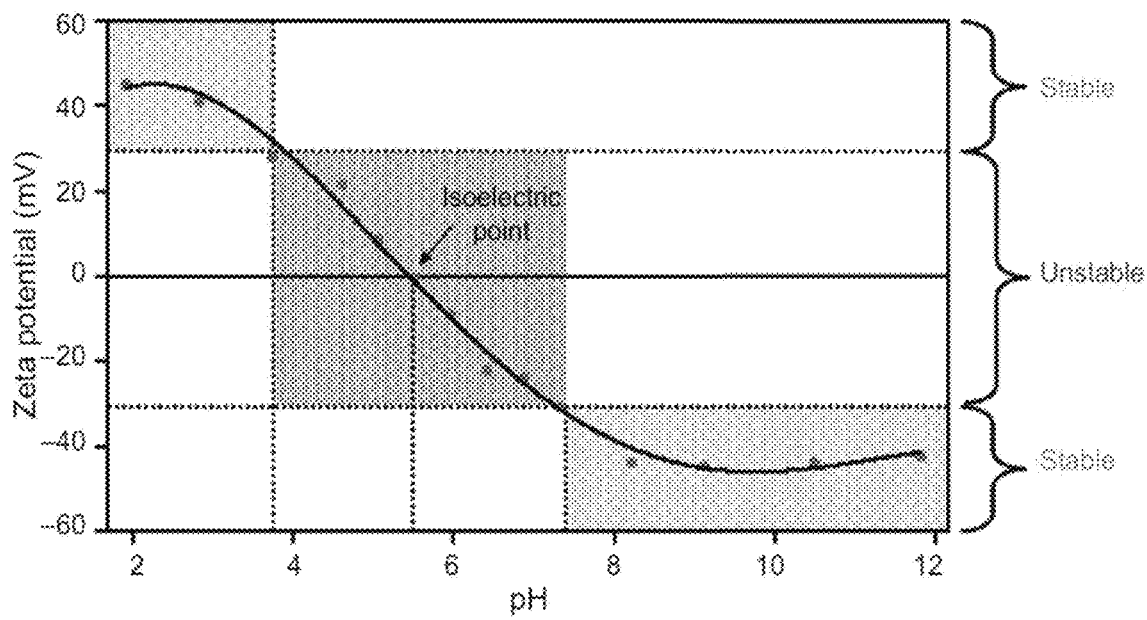
FIG. 4 illustrates a Zeta analysis for the nano-cement.
Figure 5:
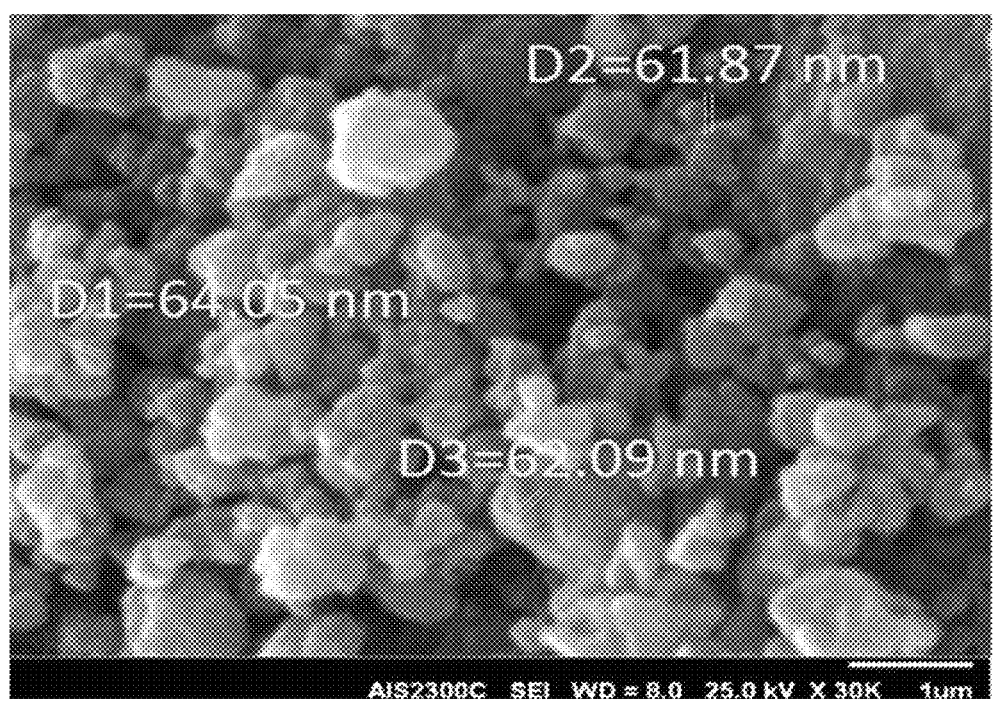
FIG. 5 illustrates an Scanning Electron Microscope (SEM) image of the nano-cement particles.

The results of the XRD test after the process are as follows: According to the presented results, the peak points in the whole nano production process have been constant, which shows that no additional material in the nano production process has been added to the batch cement. Also, the results of XRD test on the sample before and after the nano-production process show that no changes have occurred in the powder components. FIG. 4 illustrates a zeta analysis for the nano-cement. The magnitude of the zeta potential gives an indication of the potential stability of the colloidal system. If all the particles in suspension have a large negative or positive zeta potential then they will tend to repel each other and there will be no tendency for the particles to come together. The result of the analysis indicated on FIG. 4 is that in the range from 30 to 60 mV and from −30 to −60 mV the zeta potential is stable, but in the range from −30 to 30 mV the zeta potential is unstable. FIG. 5 illustrates a Scanning Electron Microscope (SEM) images of the cement particles after the process of nano-production. As shown, the measured sizes of three chosen particles are 61.87 nm, 64.05 nm and 62.09 nm, respectively.

In describing a preferred embodiment of the invention, specific terminology is resorted to for the sake of clarity. However, the invention is not intended to be limited to the specific terms so selected, and it is to be understood that each specific term includes all technical equivalents which operate in a similar manner to accomplish a similar purpose.

What is claimed is:

1. A method for improving the stability of a soil sample, the method comprising steps of:
 a) acquiring the soil sample,
 b) acquiring a batch cement,
 c) forming a modified cement powder with an average particle size of between 2 nm and 150 nm,
 d) forming an aqueous suspension of the modified cement powder,
 e) placing the aqueous suspension of the modified cement powder in an ultrasonic water bath for 5-30 min to disperse the modified cement powder for geochemical fractionation,
 f) mixing the aqueous suspension of the modified cement powder obtained in step e) with the soil sample in a weight ratio of the aqueous suspension of the cement powder to the soil sample of between 1:100 wt/wt and 18:100 wt/wt, wherein the result of step f) is a spray mixture, g) applying the spray mixture obtained in step f) to the predetermined construction site, h) allowing the structure obtained in step g) to harden for a curing time.

2. The method of claim 1, wherein the step d) of forming an aqueous suspension of the modified cement powder includes forming the aqueous suspension of the modified cement powder with a weight ratio of the modified cement powder to the water between 1:100 wt/wt and 18:100 wt/wt.

3. The method of claim 1, wherein the step d) of forming the aqueous suspension of the modified cement powder includes mixing the modified cement powder and the water in an ultrasonic homogenizer.

4. The method of claim 1, wherein the modified cement powder and the water is mixed in the ultrasonic homogenizer for the period of time between 10 minutes and 45 minutes.

5. The method of claim 1, wherein the modified cement powder suspension and the soil sample is mixed for the period of time between 1 and 15 minutes.

6. The method of claim 1, wherein the modified cement powder suspension and the soil sample is mixed in a rotary mixer with a rotational speed of between 20 rpm and 80 rpm.

7. The method of claim 1, wherein applying the spray mixture obtained in step f) to the predetermined construction site is performed with a spraying device for spraying an enclosure with the aqueous suspension of the nano-cement.

* * * * *